United States Patent
Somarowthu et al.

(10) Patent No.: US 12,202,508 B2
(45) Date of Patent: Jan. 21, 2025

(54) POWER MANAGEMENT FOR FUEL EFFICIENCY IMPROVEMENT OF SELF-PROPELLED WINDROWER

(71) Applicant: DEERE & COMPANY, Moline, IL (US)

(72) Inventors: Mahesh Somarowthu, Pune (IN); Mohan A. Vadnere, Pune (IN); Mitchell R. Usasz, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 139 days.

(21) Appl. No.: 18/093,452

(22) Filed: Jan. 5, 2023

(65) Prior Publication Data

US 2024/0227834 A1  Jul. 11, 2024

(51) Int. Cl.
*B60W 50/14* (2020.01)
*B60W 30/14* (2006.01)
(Continued)

(52) U.S. Cl.
CPC .......... *B60W 50/14* (2013.01); *B60W 30/143* (2013.01); *B60W 30/182* (2013.01);
(Continued)

(58) Field of Classification Search
CPC .. B60W 50/14; B60W 30/143; B60W 30/182; B60W 50/0097; B60W 2530/209;
(Continued)

(56) References Cited

U.S. PATENT DOCUMENTS

| | | | |
|---|---|---|---|
| 4,885,690 A * | 12/1989 | Schimmel | ........... B60R 16/0236 701/50 |
| 8,972,161 B1 * | 3/2015 | Koebler | .................. B60L 50/62 701/123 |

(Continued)

FOREIGN PATENT DOCUMENTS

| | | |
|---|---|---|
| CN | 104533647 A | 4/2015 |
| EP | 0104784 A1 | 4/1984 |
| EP | 0810121 B1 | 8/2000 |

OTHER PUBLICATIONS

Extended European Search Report and Written Opinion issued in European Patent Application No. 23215712.3 dated Jun. 11, 2024, in 09 pages.

*Primary Examiner* — Kerri L McNally
(74) *Attorney, Agent, or Firm* — Taft Stettinius & Hollister LLP; Stephen F. Rost (57) ABSTRACT

A power management system and method for a work machine that receives real time data, computes current power requirements based on the real time data, computes an optimized engine speed based on the current power requirements and a desired reserve power, and informs an operator of the optimized engine speed. The system can predict upcoming power requirements based on real time and predictive machine data, and compute the optimized engine speed based on the current and upcoming power requirements and the desired reserve power. The system can also receive predictive data, and predict the upcoming power requirements based on the predictive and real time data. Predictive data can include topographical data and/or historical power-consumption data. The system can include an automatic mode where the system automatically adjusts engine speed to the optimized engine speed. The system can maintain a constant machine ground speed as it automatically adjusts engine speed.

18 Claims, 4 Drawing Sheets

(51) Int. Cl.
*B60W 30/182* (2020.01)
*B60W 50/00* (2006.01)

(52) U.S. Cl.
CPC ... *B60W 50/0097* (2013.01); *B60W 2050/146* (2013.01); *B60W 2300/158* (2013.01); *B60W 2510/0638* (2013.01); *B60W 2530/209* (2020.02); *B60W 2556/10* (2020.02); *B60W 2556/40* (2020.02)

(58) Field of Classification Search
CPC ......... B60W 2556/10; B60W 2556/40; B60W 2050/146; B60W 2300/158; B60W 2510/0638
USPC ......................................................... 340/439
See application file for complete search history.

(56) References Cited

U.S. PATENT DOCUMENTS

| | | | |
|---|---|---|---|
| 2016/0177844 A1* | 6/2016 | Fuentes Utrilla ...... | A01B 67/00 701/110 |
| 2021/0039643 A1* | 2/2021 | Kuras ................... | B60W 10/06 |
| 2021/0239204 A1* | 8/2021 | Jahns ................... | F16H 61/0213 |
| 2022/0304240 A1* | 9/2022 | Sheidler ................ | B60W 10/08 |

* cited by examiner

POWER MANAGEMENT FOR FUEL EFFICIENCY IMPROVEMENT OF SELF-PROPELLED WINDROWER

FIELD OF THE DISCLOSURE

The present disclosure relates to agricultural machines, and more specifically relates to power management systems for agricultural windrower machines.

BACKGROUND

It can be difficult to estimate an optimal engine speed for performing upcoming work at a desired rate. Therefore, many operators will select an engine speed to maximize power capability without fully taking into account the effect on fuel efficiency. It is typical of diesel engines to be the least fuel efficient when operating at an unnecessarily high engine speed with lower power utilization. The higher engine speed provides more power to the machine but decreases the fuel efficiency of the machine.

It would be desirable to have a power management system for the machine that can determine an engine speed that provides the required power while also optimizing fuel efficiency. This can reduce fuel consumption and help users better utilize the machine.

SUMMARY

A power management system for a work machine is disclosed that includes a real time data interface configured to receive real time work machine data, and a processor configured to compute current machine power requirements based on the real time work machine data. The processor also computes an optimized engine speed based on the current machine power requirements and a desired reserve power, and informs an operator of the optimized engine speed. The processor can also predict upcoming machine power requirements based on the real time work machine data, and compute the optimized engine speed based on the current machine power requirements, the upcoming machine power requirements and the desired reserve power. The power management system can also include a predictive data interface to receive predictive data, and the processor can predict the upcoming machine power requirements based on the predictive data and the real time work machine data.

The predictive data can include topographical data for a field to be harvested by the work machine, and/or historical power-consumption data for the work machine, where the historical power-consumption data was collected when the work machine previously harvested one or more fields. The historical power-consumption data can include historical power-consumption data collected when the work machine previously harvested a current field to be harvested by the work machine, including recent historical data from the previous pass of the current field being harvested. This historical data can also be retrieved form geospatial data based on previous passes of the field, which were recorded by a prior map of the field.

The power management system can also include a mode selection control that enables the operator to select a manual mode and an automatic mode. When the automatic mode is selected, the power management system can automatically adjust work machine engine speed to the optimized engine speed. When the automatic mode is selected, the power management system can maintain a constant work machine ground speed as it automatically adjusts the work machine engine speed to the optimized engine speed.

The processor can compute the optimized engine speed based on a minimum engine operating speed and a machine reserve power curve. The processor can compute the optimized engine speed to reduce the brake specific fuel consumption value.

A power management method for a work machine is disclosed that includes receiving real time work machine data for the work machine; computing current machine power requirements based on the real time work machine data; computing a optimized engine speed based on the current machine power requirements and a desired reserve power; and informing an operator of the optimized engine speed. The power management method can also include predicting upcoming machine power requirements based on the real time work machine data; and computing the optimized engine speed based on the current machine power requirements, the upcoming machine power requirements and the desired reserve power. The power management method can also include receiving predictive data for the work machine; and predicting the upcoming machine power requirements based on the predictive data and the real time work machine data.

The power management method can also include enabling the operator to select a manual mode and an automatic mode for the work machine; and when the automatic mode is selected, automatically adjusting work machine engine speed to the optimized engine speed. When the automatic mode is selected, the power management method can also include maintaining a constant work machine ground speed while automatically adjusting the work machine engine speed to the optimized engine speed.

The power management method can also include computing the optimized engine speed based on a minimum engine operating speed and a machine reserve power curve. The power management method can also include computing the optimized engine speed to reduce the brake specific fuel consumption value.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
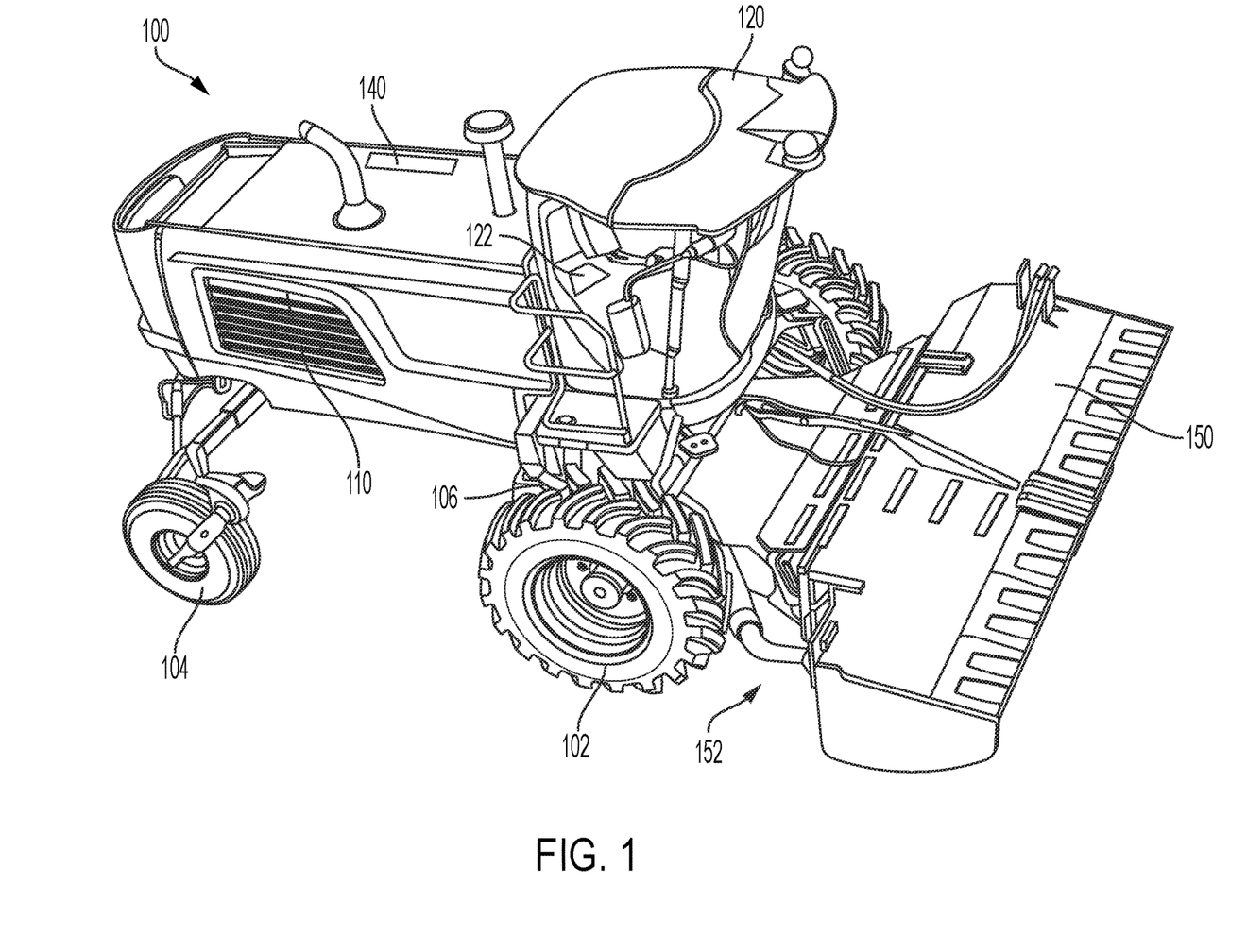
FIG. 1 illustrates a perspective view of a work machine coupled to a head or implement.

FIG. 1 illustrates a perspective view of a work machine 100 coupled to a head or implement 150. The work machine 100 may have a power unit 110 that provides mechanical, electrical and hydraulic power to the work machine 100, and can provide power to rotate a pair of drive wheels 102 coupled to a frame 106 of the work machine 100. The drive wheels 102 may rotate relative to the work machine 100 to allow the work machine 100 to traverse an underlying or ground surface. In addition to drive wheels 102, the embodiment shown in FIG. 1 has a pair of swivel caster wheels 104. The caster wheels 104 may pivot freely about a mount to allow the work machine 100 to rotate as directed by the powered drive wheels 102 and caster wheels 104. However, the particular configuration of the drive wheels 102 and caster wheels 104 should not be limiting. In a different embodiment, there may be no wheels at all. Rather, the power unit 110 may provide power to a pair of tracks to allow the work machine 100 to traverse the underlying surface. In yet another embodiment, the caster wheels 104 may not be swivel caster wheels but rather be wheels coupled to an axle and configured to be mechanically coupled to the power unit 110.

The work machine 100 may also have a cabin 120 coupled to the frame 106, and an implement mounting and positioning system 152 that can include lift arms, brackets, actuators and other mechanisms to connect and control the implement 150. The cabin 120 may house a plurality of controls 122 that allow a user to control the various systems of the work machine 100 and the implement 150. In one non-exclusive embodiment, the plurality of controls 122 are coupled to a control system 140 that monitors and send control signals to various mechanical, electrical, and hydraulic systems of the work machine 100 and the implement 150. The plurality of controls 122 may be positioned in the cabin 120 and may include one or more touch screens, knobs, buttons, levers, or any other devices capable of identifying a user input.

It can be difficult to estimate an optimal engine speed for performing upcoming work at a desired rate. Therefore, many operators will select an engine speed to maximize power capability without fully taking into account the effect on fuel efficiency. It is typical of diesel engines to be the least fuel efficient when operating at an unnecessarily high engine speed with lower power utilization. The higher engine speed provides more power to the machine but decreases the fuel efficiency of the machine. The power management system can determine an optimized engine speed for the windrower that provides the required power and takes into account the fuel efficiency. This can reduce fuel consumption and help users better utilize the machine.

Figure 2:
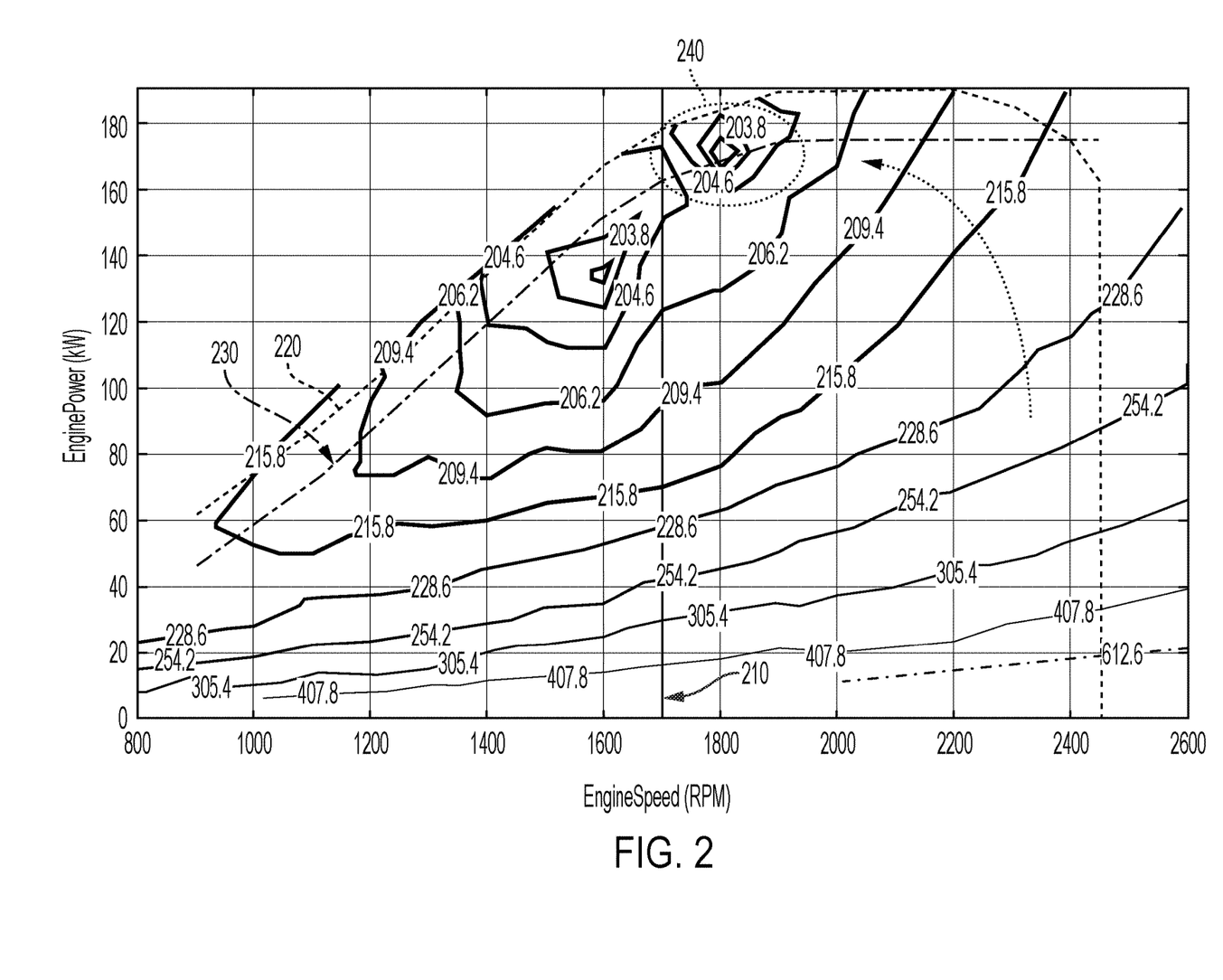
FIG. 2 illustrates an exemplary graph of engine speed versus engine power showing brake specific fuel consumption (BSFC) levels as contours and contour lines.

FIG. 2 illustrates an exemplary graph of engine speed versus engine power showing brake specific fuel consumption (BSFC) levels as contours and contour lines. The X-axis is engine speed measured in rotations per minute (rpm), and the Y-axis is engine power measured in kilowatts (kW). BSFC is a measure of the fuel efficiency of a machine that burns fuel and produces rotational, or shaft power. BSFC can be expressed in grams per kilowatt-hour or similar units. The lower the BSFC value, the greater the fuel efficiency.

FIG. 2 also shows a minimum engine operating speed line 210, a maximum power curve 220 and a rated/reserve power curve 230. In this exemplary graph, the minimum engine operating speed line 210 is at about 1700 rpm, and the maximum power curve 220 drops off dramatically as the engine speed goes above about 2450 rpm. The graph of FIG. 2 shows the BSFC levels decreasing as engine power approaches the maximum power curve 220 and the engine speed approaches the minimum engine operating speed 210, meaning that low power-utilization at higher engine speeds produce lower fuel efficiency.

In this example, for a power requirement along the rated/reserve power curve 230, the operator may initially operate the machine at a higher engine speed, such as 2350 rpm which has a BSFC level of about 216. The power management system would reduce or suggest reduction of the engine speed to a more fuel efficient region 240 where rpm is in the 1800-1900 range, the rated/reserve power curve 230 is at or near its maximum and the BSFC level is at or near its minimum of about 204. The lower engine speed and BSFC value, 204 versus 216, for the same or similar rated/reserve power shows the fuel efficiency improvement with little or no loss of available machine power. Engines are the most fuel efficient (fuel spent per work done) in the lower engine speed and the higher engine power utilization zone. The closer the machine is run to this higher engine power utilization zone 240 the better the fuel efficiency of the machine.

The power management system cannot control the required power level, but it can control the engine speed. The required power level is driven by the load. In the example of FIG. 2, the operator is operating at a higher engine speed (2350 RPM) in conditions that require a lower power level (~90 kW). So the machine could change the engine speed or recommend the engine speed be changed to a lower speed of 1800 RPM, because this engine speed would still provide sufficient power overhead with the operator's current operating conditions. This change in engine speed would improve the static fuel efficiency only 15-20 g/(kW-h). However, in addition to the static improvement, as the load or required power level varies during the operation, moving vertical on the BSFC plot, the improvement in fuel efficiency is even greater.

Power requirements can change for various reasons and it is desirable that the power management system leave some overhead to deal with these potential changes. If the power management system is determining an engine speed to meet current machine power demands and the machine goes up a hill, or encounters a thick region of crop, or encounters some other load increasing condition, it is desirable that the engine speed be able to deal with these circumstances without stalling or having to experience some other undesirable situation. The power management system can be configured to recognize an engine stall risk, and take action to avoid the engine stall. For example, the power management system can temporarily reduce the ground speed of the machine to reduce the vehicle load, or take some other action to attempt to allow the engine speed to recover and not stall.

The work machine 100 may include engine speed governing features that provide closed-loop speed control based on a set-point determined from several different configurable inputs. When operating under governor control, the desired power or torque command (and subsequently, fueling) is varied automatically to maintain the optimized engine speed. For instance, if the engine 110 suddenly comes under an increased load, as its speed drops, the governor responds by increasing fuel in order to maintain the optimized engine speed. If the engine 110 comes under an exceptionally high load, the governor power command may exceed the limits of the maximum power curve 220. If this happens, fueling will be limited by the maximum power curve 220 curve and as a result the engine speed will continue to decrease until an equilibrium is achieved or the load decreases. This is considered a 100% load condition.

The power management system can identify the current power requirements of the machine based on various parameters, for example based on current engine load, vehicle speed, harvesting settings, crop density sensor readings, etc. The harvesting settings can include, for example, header cutting speed, header load, etc. The control system 140 can be coupled to various systems and sensors on the machine 100 and implement 150 that provide the necessary information to the power management system to determine the current power requirements of the machine.

The power management system can also predict future or upcoming power requirements for the machine based on topographical field contour maps, upcoming crop density, machine power requirement history during harvesting, etc. Forward-looking sensors (for example, cameras, LIDAR or other sensors), positioning sensors and other sensors and databases on-board or off-board the machine can be used to supply data to predict upcoming power requirements. A machine learning model can help with the predictions by the power management system. The power management system and any associated machine learning model can collect current and historical power-consumption and related data that can be used to predict upcoming power requirements for the machine. This power-consumption data can include recent historical data from the previous pass of the field currently being harvested. This historical data can also be retrieved form geospatial data based on previous passes of the field, which were recorded by a prior map of the field.

This collected power-consumption and related data can be stored on-board and/or off-board the machine. This data can be collected over various conditions and various fields, and can then be used to predict upcoming machine power requirements when the same or similar conditions are expected to occur. In addition, when a field is harvested where power-consumption and related data had previously been collected, that previous power-consumption and related data can be used to predict upcoming machine power requirements for the same field.

The power management system can then determine the desired power level based on the current and predicted power requirements, and then find the optimized engine speed based on the BSFC levels. The power management system can then display and/or implement the optimized engine speed for operator reference.

The machine can include a mode selection control to enable the operator to select between a manual mode, an automatic mode, and possibly other power management modes. In the manual mode, the power management system can display the optimized engine speed for operator reference and the operator can decide whether or not to change the engine speed towards the optimized engine speed. In the automatic mode, the power management system can automatically adjust the machine engine speed smoothly towards the optimized engine speed, whether that requires ramping up or ramping down the engine speed.

Figure 3:
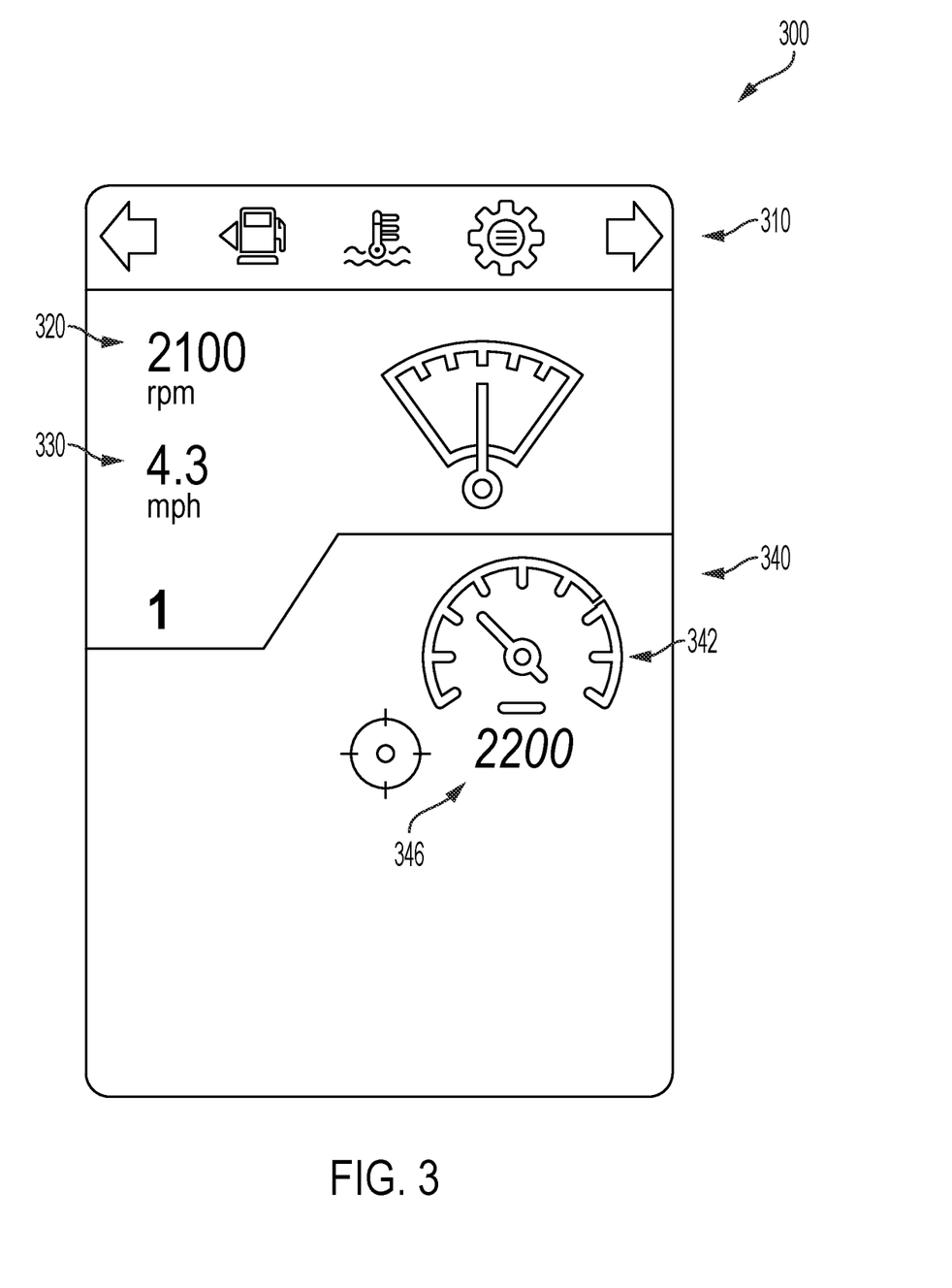
FIG. 3 illustrates an exemplary display that includes outputs from a power management system of a work machine.

FIG. 3 illustrates an exemplary display 300 that includes outputs from the power management system. The display 300 includes an upper section 310 with various machine status icons, a current engine speed display 320, a current machine speed display 330, and a power management display section 340. The power management display section 340 includes a power gauge 342 and an optimized or target engine speed value 346. In this example, the current engine speed display 320 shows 2100 rpm, while the optimized or target engine speed value 346 determined by the power management system shows 2200 rpm. So the power management system recommends that the engine speed be increased from 2100 rpm to 2200 rpm.

In some embodiments, the real-time data can be collected and used by power management system to monitor current and predicted power requirements of the machine 100. The power management system can then determine a desired power level based on the current and predicted power requirements, and then determine an optimized engine speed based on the BSFC levels. The power management system can then inform the operator of the optimized engine speed or automatically implement the optimized engine speed.

In other embodiments, in addition to the real-time data, the power management system can have access to historical power-consumption and related data that can be used to help predict upcoming power requirements of the machine 100. The power management system can then determine a desired power level based on the current and predicted power requirements using the real-time and historical data. The power management system can then determine an optimized engine speed based on the BSFC levels. The power management system can then inform the operator of the optimized engine speed or automatically implement the optimized engine speed.

In yet other embodiments, the historical power-consumption and related data can include data for the field currently being harvested which can also be used to help predict upcoming power requirements of the machine 100. The power management system can then determine a desired power level based on the current and predicted power requirements using the real-time and historical data. The power management system can then determine an optimized engine speed based on the BSFC levels. The power management system can then inform the operator of the optimized engine speed or automatically implement the optimized engine speed.

In embodiments where the power management system automatically implements the optimized engine speed, it may be desirable that the ground speed of the machine remain constant. This can be implemented by various methods, including for example electronic control of the propulsion system of the machine 100. The power management system can then automatically vary the engine speed to improve fuel efficiency while also varying power allocation to the propulsion system to maintain a desired ground speed of the machine 100. It may be desirable to maintain a constant ground speed of the machine 100 to maintain coordination with other vehicles and systems during harvesting. The desired ground speed for the machine 100 can be controlled using the plurality of controls 122 and the control system 140.

Figure 4:
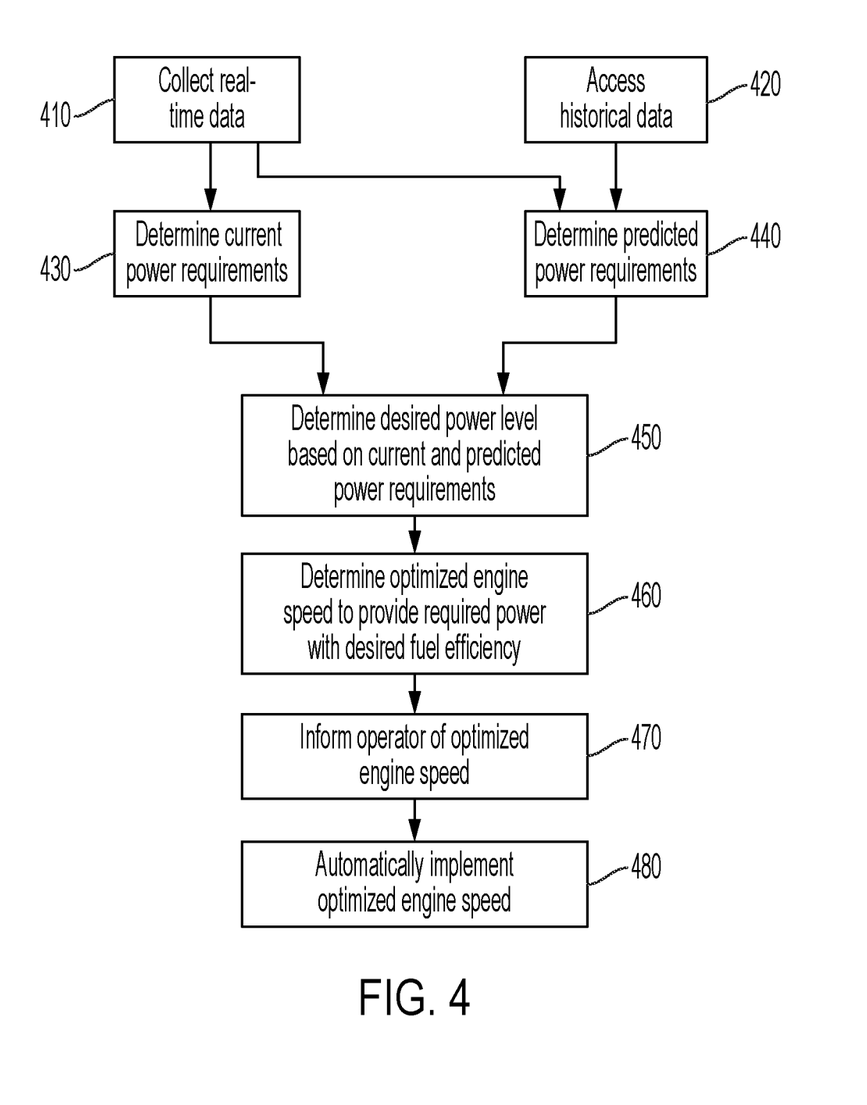
FIG. 4 illustrates an exemplary flow diagram for a power management system.

FIG. 4 illustrates an exemplary flow diagram for a power management system. At block 410, the power management system collects and/or receives the real-time data for the machine 100 and implement 150. At block 420, the power management system accesses historical power-consumption and related data that can be used to help predict upcoming power requirements of the machine 100. The historical power-consumption and related data can be stored on-board or remote from the machine 100.

At block 430, the power management system determines the current power requirements of the machine 100 based on the real-time data. At block 440, the power management system determines the predicted future power requirements of the machine 100 based on the real-time data and the historical data. At block 450, the power management system determines a desired power level based on the current and predicted future power requirements. At block 460, the power management system determines an optimized engine speed to provide the desired power level with the desired fuel efficiency and reserve, for example by using BSFC levels. At block 470, the power management system informs the operator of the optimized engine speed. In some embodiments at block 480, the power management system automatically implements the optimized engine speed. In some embodiments at block 480, the power management system automatically implements the optimized engine speed while maintaining a desired ground speed for the machine 100.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A power management system for a work machine, the power management system comprising:
    a real time data interface configured to receive real time work machine data;
    a processor configured to compute current machine power requirements based on the real time work machine data;
    the processor further configured to compute an optimized engine speed based on the current machine power requirements and a desired reserve power, and to inform an operator of the optimized engine speed;
    the processor is further configured to predict upcoming machine power requirements based on the real time work machine data; and
    the processor is further configured to compute the optimized engine speed based on the current machine power requirements, the upcoming machine power requirements and the desired reserve power.

2. The power management system of claim 1, further comprising:
    a predictive data interface configured to receive predictive data;
    wherein the processor is further configured to predict the upcoming machine power requirements based on the predictive data and the real time work machine data.

3. The power management system of claim 2, wherein the predictive data includes topographical data for a field to be harvested by the work machine.

4. The power management system of claim 2, wherein the predictive data includes historical power-consumption data for the work machine, the historical power-consumption data collected when the work machine previously harvested one or more fields.

5. The power management system of claim 4, wherein the historical power-consumption data includes historical power-consumption data collected when the work machine previously harvested a field to be harvested by the work machine.

6. The power management system of claim 2, further comprising:
    a mode selection control configured to enable the operator to select a manual mode and an automatic mode;
    wherein when the automatic mode is selected, the power management system automatically adjusts work machine engine speed to the optimized engine speed.

7. The power management system of claim 6, wherein when the automatic mode is selected, the power management system maintains a constant work machine ground speed as it automatically adjusts the work machine engine speed to the optimized engine speed.

8. The power management system of claim 2, wherein the processor is further configured to compute the optimized engine speed based on a minimum engine operating speed and a machine reserve power curve.

9. The power management system of claim 8, wherein the processor is configured to compute the optimized engine speed to reduce the brake specific fuel consumption value.

10. A power management method for a work machine, the power management method comprising:
    receiving real time work machine data for the work machine;
    computing current machine power requirements based on the real time work machine data;
    computing an optimized engine speed based on the current machine power requirements and a desired reserve power;
    informing an operator of the optimized engine speed;
    predicting upcoming machine power requirements based on the real time work machine data; and
    computing the optimized engine speed based on the current machine power requirements, the upcoming machine power requirements and the desired reserve power.

11. The power management method of claim 10, further comprising:
    receiving predictive data for the work machine; and
    predicting the upcoming machine power requirements based on the predictive data and the real time work machine data.

12. The power management method of claim 11, wherein the predictive data includes topographical data for a field to be harvested by the work machine.

13. The power management method of claim 11, further comprising:
    collecting historical power-consumption data for the work machine, the historical power-consumption data being collected when the work machine previously harvested one or more fields; and
    predicting the upcoming machine power requirements based on the historical power-consumption data for the work machine.

14. The power management method of claim 13, wherein the historical power-consumption data includes historical power-consumption data collected when the work machine previously harvested a field to be harvested by the work machine.

15. The power management method of claim 11, further comprising:
    enabling the operator to select a manual mode and an automatic mode for the work machine; and
    when the automatic mode is selected, automatically adjusting work machine engine speed to the optimized engine speed.

16. The power management method of claim 15, further comprising:
    when the automatic mode is selected, maintaining a constant work machine ground speed while automatically adjusting the work machine engine speed to the optimized engine speed.

17. The power management method of claim 11, further comprising:
    computing the optimized engine speed based on a minimum engine operating speed and a machine reserve power curve.

18. The power management method of claim 17, further comprising:
    computing the optimized engine speed to reduce the brake specific fuel consumption value.

* * * * *